United States Patent
Lindell et al.

(10) Patent No.: US 10,630,486 B2
(45) Date of Patent: *Apr. 21, 2020

(54) MULTIPARTY COMPUTATION FOR APPROVING DIGITAL TRANSACTION BY UTILIZING GROUPS OF KEY SHARES

(71) Applicants: Unbound Tech Ltd, Petach Tiqva (IL); Bar-Ilan University

(72) Inventors: Yehuda Lindell, Givat Shmuel (IL); Guy Pe'er, Talme Yechiel (IL)

(73) Assignees: UNBOUND TECH LTD., Petach Tiqva (IL); BAR ILAN UNIVERSITY, Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,420

(22) Filed: Sep. 12, 2018

(65) Prior Publication Data

US 2020/0084048 A1 Mar. 12, 2020

(51) Int. Cl.
| | |
|---|---|
| *H04L 29/06* | (2006.01) |
| *H04L 9/32* | (2006.01) |
| *H04L 9/08* | (2006.01) |

(52) U.S. Cl.
CPC ............ *H04L 9/3255* (2013.01); *H04L 9/085* (2013.01)

(58) Field of Classification Search
CPC .............................. H04L 9/3255; H04L 9/085
See application file for complete search history.

(56) References Cited

U.S. PATENT DOCUMENTS

| | | | | |
|---|---|---|---|---|
| 2003/0084003 A1* | 5/2003 | Pinkas | ............... | G06Q 20/3829 705/71 |
| 2003/0190046 A1* | 10/2003 | Kamerman | ............. | H04L 9/006 380/286 |
| 2015/0081567 A1* | 3/2015 | Boyle | ................ | G06Q 20/3829 705/71 |

(Continued)

OTHER PUBLICATIONS

Andrychowicz et al "Multiparty Computation Protocols Based on Cryptocurrencies" May 2015, University of Warsaw, PhD dissertation. pp. 1-137 (Year: 2015).*

(Continued)

*Primary Examiner* — Harunur Rashid
(74) *Attorney, Agent, or Firm* — Alphapatent Associates, Ltd; Daniel J. Swirsky

(57) ABSTRACT

The present invention discloses a method and system for securing digital transactions provided by a person operating a third-party computerized device designed to communicate with a multiparty signing system. The multiparty signing system may comprise a signing subsystem comprising a multiparty signing server designed to receive a request for digital signing and a first subset of end-user nodes designed to generate a group of key shares which can be utilized in MPC processes conducted by the multiparty signing server. The multiparty signing system may also comprise an approving subsystem designed for generating groups of key shares to approve the digital transactions. The approving subsystem may comprise a coordinator and a second subset of end-user nodes for generating groups of key shares. The multiparty signing server may be configured to receive from a third-party server a transaction to sign and to send a first request to the coordinator to receive a first group of key shares.

17 Claims, 10 Drawing Sheets

(56) References Cited

U.S. PATENT DOCUMENTS

2015/0271146 A1* 9/2015 Holyfield ............ H04L 63/0428
  713/171
2016/0027011 A1* 1/2016 Ninomiya ............ G06Q 20/401
  705/75

OTHER PUBLICATIONS

Warren et al "Bitmessage: A Peer-to-Peer Message Authentication and Delivery System" Nov. 27, 2012, www.Bitmessage.org, pp. 1-5 (Year: 2012) (Year: 2012).*

* cited by examiner

MULTIPARTY COMPUTATION FOR APPROVING DIGITAL TRANSACTION BY UTILIZING GROUPS OF KEY SHARES

FIELD OF THE INVENTION

The invention generally relates to the field of cryptography and digital signing processes, more specifically to the usage of multiparty decryption to approve a digital transaction.

BACKGROUND OF THE INVENTION

Multi-signature is a digital signature scheme which allows a group of users to sign a single document. Usually, a multi-signature algorithm produces a joint signature that is more compact than a collection of distinct signatures from all users. In crypto currency, a multi-signature refers to requiring more than one key to authorize a crypto-currency transaction. The system of crypto currency does not require a central authority. In crypto-currency the system allows transactions to be performed in which ownership of the cryptographic units is changed. A transaction statement can only be issued by an entity proving the current ownership of these units. In some cases, the basic system of crypto-currency (such as a Bitcoin) provides very limited means to control, overrule, or approve a transaction. Hence the lack of authority may limit the utilization of crypto-currency in complex transaction wherein multiple participates are involved. Furthermore, in some cases, crypto-currency may be the best candidate for digital transaction wherein tracking the transaction does not require keeping each transaction in the book. Yet, in the modern world of the internet, securing financial transactions is required in order to control the transactions and the authorization rules.

SUMMARY OF THE INVENTION

The present invention discloses a method and system for securing digital transactions provided by a person operating a third-party computerized device designed to communicate with a multiparty signing system. The multiparty signing system may comprise a signing subsystem comprising a multiparty signing server designed to receive a request for digital signing and a first subset of end-user nodes designed to generate a group of key shares which can be utilized in MPC processes conducted by the multiparty signing server. The multiparty signing system may also comprise an approving subsystem designed for generating groups of key shares to approve the digital transactions. The approving subsystem may comprise a coordinator and a second subset of end-user nodes for generating groups of key shares. The multiparty signing server may be configured to receive from a third-party server a transaction to sign and to send a first request to the coordinator to receive a first group of key shares.

The coordinator of the approving subsystem may be configured to receive the first request from the multiparty signing server and to send to the second subset of the end-user nodes a second request to receive the first group of key shares. The coordinator may also be configured to receive from the second subset of the end-user nodes the first group of key shares and to send the received first group of key shares to the multiparty signing server. The multiparty signing server may also be configured to utilize the received first group of key shares and a second group of key shares to conduct a multiparty computation (MPC) process with the first subset of end-user nodes, wherein the signature is the output of the MPC process. The multiparty signing server may also be configured to send the signed transaction to the third-party server.

The method for securing digital transactions operable by a multiparty signing server communicating with a coordinator, wherein the multiparty signing server is connected to a first subset of end-user nodes and the coordinator is connected to a second subset of end-user nodes. method disclosed herein may be operable by the multiparty signing system and configured for receiving a transaction to sign by the multiparty signing server, wherein the transaction to sign is provided by a third-party server. Then, the multiparty signing server may send a first request to the coordinator for receiving a first group of key shares. The coordinator which may receive the first request may send a second request to receive the first group of key shares, wherein the second request is sent to the second subset of the end-user nodes. The coordinator may receive the first group of key shares from the second subset of the end-user nodes and send the received first group of key shares to the multiparty signing server.

The multiparty signing server may conduct an MPC process generate a signature, wherein the MPC process is conducted between the multiparty signing server and the to the first subset of the end-user nodes, by using the received first group of key shares and a second group of key shares held by the first subset of the end-user nodes. Upon receiving by the multiparty signing server, the signature on the transaction as a result of the MPC process, the multiparty signing server may send the signed transaction to the third-party server, for carrying out an operation to which the signed transaction was required.

The digital signing can be a computerized process embodied by the system for generating valid and approved digital signatures by a distributed shares of a private cryptographic signing key which can be provided to a third-party entity. In such case, a valid and approved digital signature gives to the third party a pledge that the digital transaction was signed and approved by authorized entities, that the signing entity cannot deny having signed that digital transaction, that the approving entity cannot deny having approved that digital transaction, and that the digital transaction and the details thereof were not altered in transit. The at least two servers who carry out multi-party computation may also carry out multi-party computation to generate an encrypted digital signature under a public-key not known to the servers. In some cases, the at least two servers hold shares of the cryptographic signing key and use them in the MPC.

The multiparty signing server may also be configured to engage a certain number of end-user nodes for decrypting the encrypted signature. In some cases, the engagement may be performed by communicating with the end-user nodes and send a request to participate by the multiparty signing server. In some cases, the end-user node participating in the decrypting process may engage with the multiparty signing server, which may also be defined as an end-user-key-protection-server, automatically, upon a request from said end-user-key-protection-server.

In such a case, the end-user nodes may hold key shares of a cryptographic key. The cryptographic key may be utilized to decrypt the encrypted signature. For example, the end-user-key-protection-server may receive an encrypted signature, generated by the at least two servers in an MPC process, wherein the key utilized for the encryption is a public key used in key pair with a private key. In such an exemplary case, the end-user-key-protection-server may utilize an MPC with a certain number of key shares of the private key, wherein the private key is distributed amongst a certain number of end-user nodes, which can approve the digital transaction by using their required key share in the MPC.

In some cases, the end-user-key-protection-server may utilize a threshold cryptosystem with the end-user nodes using key shares of the private key to decrypt the signature. In some cases, the end-user-key-protection-server may conduct an MPC decryption processes with some of the end-user nodes to decrypt the encrypted signature using the key shares of the private key. In such a case, if the encrypted signature is decrypted, the end-user-key-protection-server may approve the transaction. In some cases, if the number of end-user nodes which approved the digital transaction does not exceed the threshold, the digital transaction may be disapproved. In some other cases, some end-user nodes may be granted with the privileges to exclusively disapprove. Thus, the end-user-key-protection-server may encode authorization rules corresponding for MPC decryption processes of the encrypted signature. The authorization rules may comprise some combinations of end-user nodes required to participate in the MPC processes for decrypting the encrypted signature. In some cases, the authorization rules may comprise Boolean operators amongst the key shares utilized in the MPC decryption processes of the encrypted signature. For example, in case an end-user node is granted with the privileges to overrule an approval of a transaction, if the privileged end-user node does not use the end-user node's key share and participate in the MPC, the digital transaction will be disapproved.

In some cases, the end-user-key-protection-server may be utilized to secure transactions with crypto-currency wherein multi-signature is required. In some cases, the method and system disclosed in the present invention, may be utilized in case of a digital vault. Such a digital vault is a dedicated server software code which is executable on dedicated server computers comprising hardware storage device for storing data which in some cases may be accessible only by dedicated server computers. In such a case, a transaction may be considered as viewing a document located in the digital vault. The system disclosed in the present invention may be utilized to require an approval provided by a minimal quorum to approve the view on the document.

In some cases, a digital transaction may be viewed as a document in a digital vault. In some other cases, the digital transaction may be a digital process over computer networks which approve or disapprove digital action occurred by users. For example, a digital transaction may approve entering to a digital site on the internet, view documents, purchase or order goods on the internet, and the like.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a system and method designed to secure digital transactions by encoding authorization rules of the digital transactions into a multiparty signing process conducted by the digital transactions' approvers. In some cases, the digital transactions may incorporate digital signature technology which provides a function corresponding to signatures for electronic digitized data such as documents, digital transaction approvals, multimedia data, and the like. These authorization processes can be operated between a computerized device operated by a user and a transaction server which controls the digital transactions. Controlling the digital transaction may be performed by an access structure comprising multiple computerized devices capable of communicating with an end-user-key-protection server. The access structure may comprise additional servers which can participate in the transaction approval processes. In some cases, the end-user nodes may be connected in a hierarchy structure which can control the approval processes of the digital transactions. Such a structure of servers and end-user nodes designed for controlling approval processes is defined herein as "access structure format".

Figure 1:
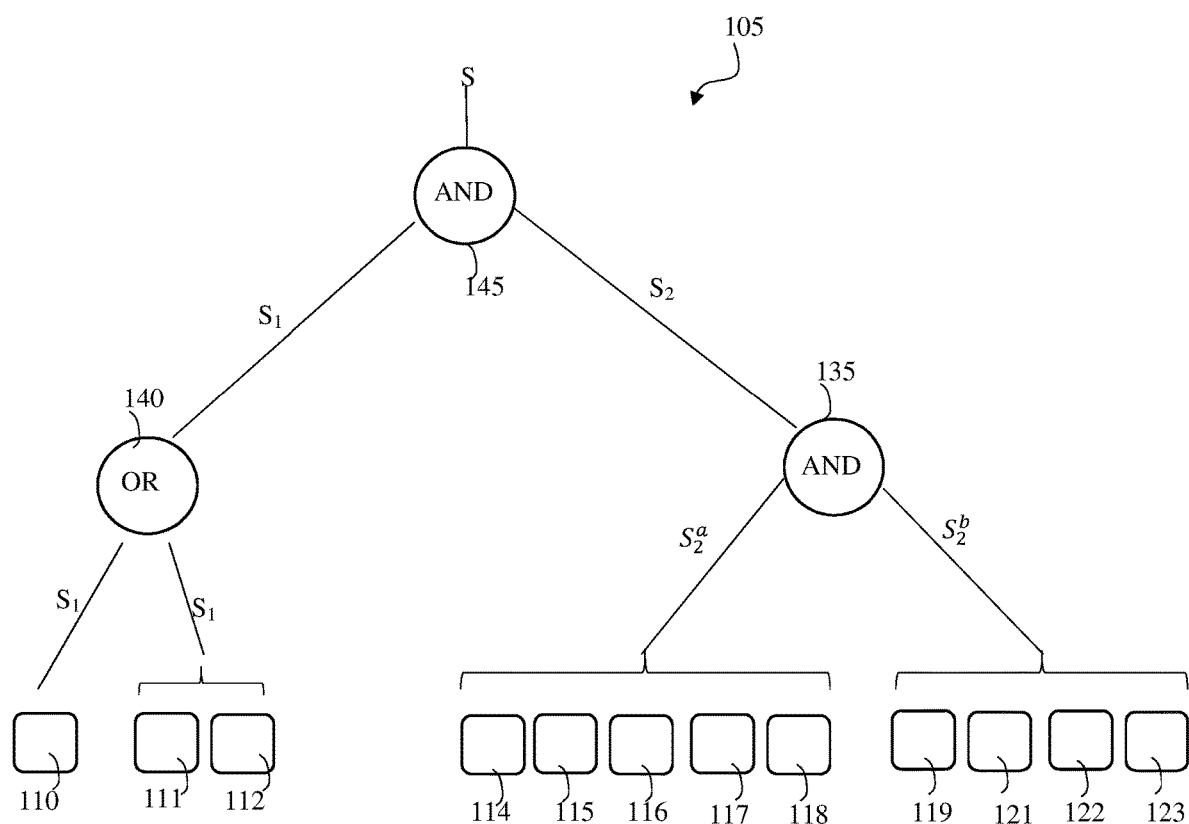
FIG. 1 shows a data structure configured in an access structure format, which controls a multiparty digital signing, according to exemplary embodiments of the present invention.

FIG. 1 shows a data structure configured in an access structure format, which controls a multiparty digital signing, according to exemplary embodiments of the present invention. FIG. 1 shows a system which operates an access structure 105 designed to control shares of cryptographic keys utilized for digital signing.

In some cases, the access structure 105 may be formed by multiple end-user nodes which can interact with each other. The nodes can be a computerized system such as a computer, computerized server, computerized mobile telephone, personal computer, computer unit, tablet personal computer, and the like. The access structure 105 comprises nodes 145, 140, and 135 which determine if a subset of end-user nodes is an authorized subset for jointly computing a digital signing operation or decrypting an encrypted signature. In access structure 105 the end-user nodes 110, 111, 112, 114, 115, 116, 117, 118, 119, 121, 122, and 123 can be configured to hold cryptographic key shares for decrypting a digital encrypted signature, and thereby be utilized to approve digital transactions controlled by the end-user-key-protection-server 235. The subsets of end-user nodes in access structure 105, can encode some threshold rules defining the number of nodes in the subsets required for jointly computing a digital signing operation or decrypting an encrypted signature. The threshold rules encoded in the subsets of end-user nodes in access structure 105 are embodied according to a threshold cryptosystem known for a person having ordinary skills in the art. For example, the data structure embodies in access structure 105 defines that an authorized subset comprises either end-user node 110 or both of end-user nodes 111 and 112, wherein the threshold encoded for end-user nodes 111 and 112 is two (2) AND at least three (3) of the end-user nodes 114, 115, 116, 117, 118 AND at least two (2) of the end-user nodes 119, 121, 122, 123.

The access structure 105 demonstrates how a secret, i.e., cryptographic key can be shared according to such an access structure. The access structure 105 comprises a node 145 functioning as the root of a node tree which holds a secret S. Node 145 can be an AND node and the values $S_2$ and $S_1$ can be chosen randomly such that $S_2$ and $S_1$ sum to S. $S_2$ and $S_1$ can be assigned to nodes 135 and 140 respectively. Share $S_2$ can be assigned to the node 135 and split at random into $S_2^a$ and $S_2^b$. The subset of end-user nodes 114, 115, 116, 117, 118 can hold shares of $S_2^a$, i.e., Shamir shares of $S_2^a$, encoded with a threshold three (3). The subset of end-user nodes 119, 121, 122, 123 can hold shares of $S_2^b$ encoded with a threshold two (2). In such a case, the end-user node 110 can hold the share $S_1$ and the end-user nodes 111, 112 can hold shares of $S_1$ encoded with threshold two (2).

In some cases, nodes 135, 140 and 145 may be a software implemented entities, operated on a computerized device designed to carry computer instructions. For example, nodes 135, 140 and 145 may be three standalone software applications operated independently on one computerized device. The nodes 110, 111, 112, 114, 115, 116, 117, 118, 119, 121, 122, 123 can be standalone end-user nodes operated on several computerized devices. In such an exemplary case, the end-user nodes can hold shares of the secret S, such that an authorized subset, as determined by the tree structure, can reconstruct the secret S.

In some cases, an authorized subset of the nodes 110, 111, 112, 114, 115, 116, 117, 118, 119, 121, 122, 123 can be configured to execute a secure multiparty computation for carrying out a computation which utilizes the secret S, without ever revealing the secret S. The secure multiparty computation can be such as, generating a digital signature where S can be the private signing key, decrypting a ciphertext wherein S can be the private decryption key, decrypting an encrypted signature where S can be the private decryption key, and the like. In some cases, the access structure 105 may be configured to provide the result of the secure multiparty computation to a third party such as a digital vault, a network vault, an authentication server, and the like.

In possible embodiments of the present invention, the key shares $S_1$, $S_2^a$ and $S_2^b$ configured to construct S can be shared amongst the end-user nodes using Shamir secret sharing. In possible embodiments of the present invention, the end-user key share may also be split to multiple shares, wherein at least one of the key shares is stored by the end-user node, and the others at other servers.

In some embodiments of the present invention, the access structure 105 may be configured to conduct a threshold decryption process to provide further security and reliability. In such embodiments, the threshold decryption process is the process which carries out the threshold rules defining the number of nodes in the subsets required for jointly computing a digital signing operation or decrypting an encrypted signature. More specifically, the threshold decryption encoded in the access structure 105 may require M end-user nodes participating in the signature decryption process which may be a portion of end-user nodes. The M end-user nodes may be the requirement of a threshold decryption process. In such a case, the letter M represent natural numbers which are utilized for counting.

Figure 2:
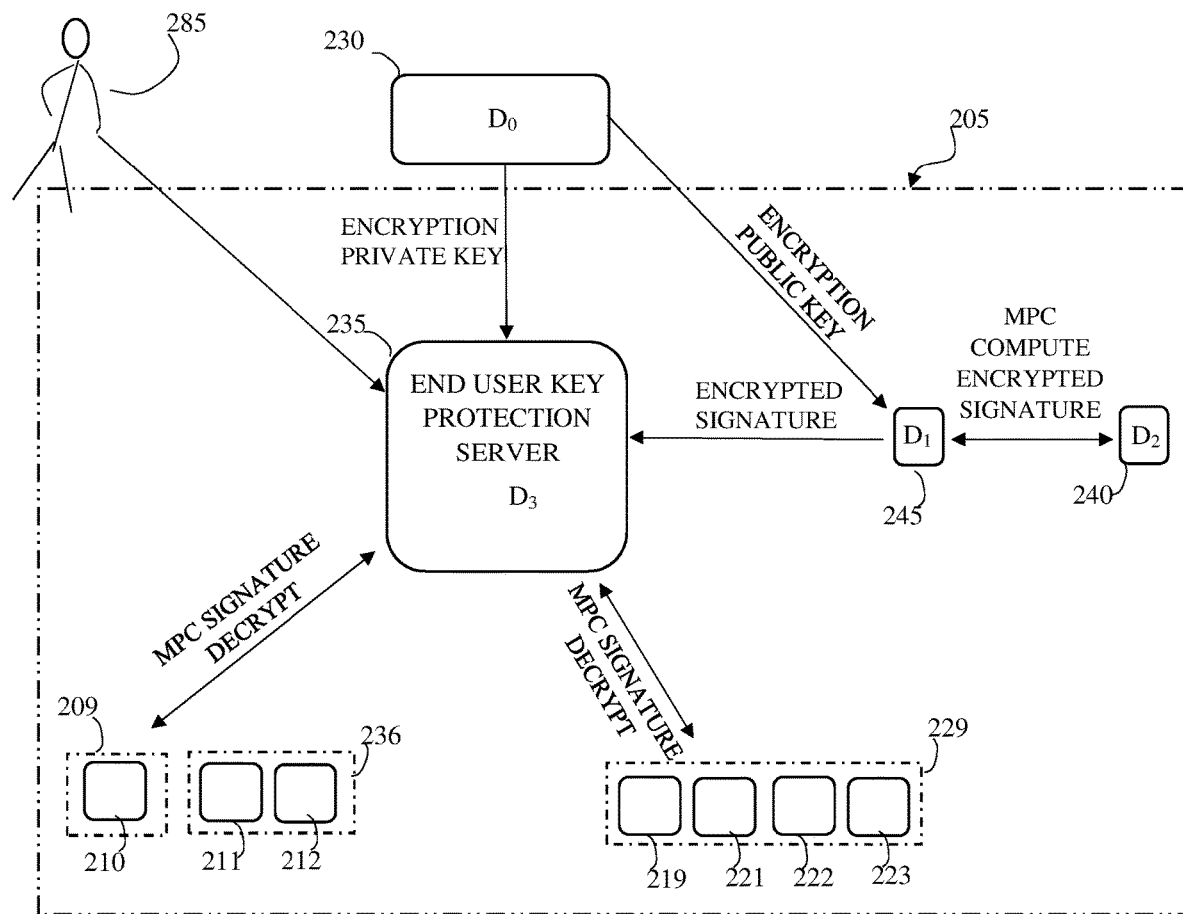
FIG. 2 shows an access structure-based system which encodes the authorization rules corresponding for MPC decryption processes, according to exemplary embodiments of the present invention.

FIG. 2 shows an access structure-based system which encodes the authorization rules corresponding for MPC decryption processes, according to exemplary embodiments of the present invention. FIG. 2 shows a system operating an access structure 205 which encodes the authorization rules for utilizing cryptographic keys in the digital signing process. The access structure 205 comprises an end-user-key-protection-server 235 also denoted as $D_3$. End-user-key-protection-server 235 can protect the key shares distributed amongst the end-user nodes and shown as nodes 210, 211, 212, 219, 221, 222, and 223. The key shares distributed amongst the nodes of end-users can be used to decrypt the encrypted signature generated by servers $D_1$ and $D_2$. The access structure 205 is not limited to any specific configuration of $D_0$, $D_1$, $D_2$ In some cases, the access structure 205 may comprise alternative settings of $D_0$, $D_1$, $D_2$. For example, in some cases the access structure 205 may not comprise a $D_2$ server and the MPC for computing the encrypted signature may not be performed. In some other case, the access structure 205 may comprise additional server or servers denoted from $D_1$, and up to $D_N$, for some natural number N, and all servers from $D_1$ up to $D_N$ executing MPC to generate the encrypted signature In some cases, the private decryption key may be the key distributed to the nodes of the end-users. The key distribution may be configured such that only an authorized subset of end-user nodes can decrypt and obtain a decrypted digital signature. In some embodiments of the present invention an MPC protocol may be utilized to generate and the distributed key shares such that, an MPC based protocol may operate between end-user-key-protection-server 235 and the end-user nodes to decrypt the encrypted digital signature. For example, end-user node 210 may conduct an MPC process with end-user-key-protection-server 235 to generate the share of the decryption of the encrypted signature. After receiving the shares, the end-user-key-protection-server 235 can decrypt the encrypted signature and obtain the cleartext signature, without any of the key shares being revealed.

In some embodiments of the present invention, the end-user nodes may be grouped to node-groups utilized to encode the authorization logics. In such case, the end-user node 210 can be defined in a node-group 209, end-user nodes 211, and 212 can be defined in a node-group 236, and end-user nodes 219, 221, 222 and 223 can be defined in a node-group 229. In some cases of a digital signing process the node-groups may be utilized to encode the authorization process of digital signing process. For example, approvals of a certain type of transactions may be configured to be approved with a portion of end-user nodes by a threshold decryption process. In such an exemplary case, an approval may require by at least one end-user node from node-group 236, at least one end-user node from node-group 209, and a at least three (3) end-user nodes from node-group 229, to participate in the MPC process. In some embodiments of the present invention, alternative node-groups may be connected or communicated with the access structure 205. Thus, the access structure 205 may not be limited to one setting of end-user nodes.

The end-user-key-protection-server 235 may conduct an MPC decryption process to decrypt the encrypted signature. The MPC process may be utilized to ensure none of the end-user nodes nor the end-user-key-protection-server 235 are exposed to the key shares of other nodes or end-user nodes. For example, end-user-key-protection-server 235 may conduct an MPC process with two nodes from the node-group 229 without being exposed to the key shares stored in said end-user nodes.

The access structure 205 may also comprise server 245, denoted as $D_1$ and server 240 denoted as $D_2$. $D_1$ and $D_2$ which may be configured to generate an encrypted signature by utilizing and MPC protocol. In some cases, the encrypted signature may use an encryption key from a third-party server. Such a third-party server can be a digital vault, an authentication server, and the like. The third-party server can be a be represented by server 230, denoted as $D_0$. The third-party server 230 can be a computerized device comprising computer-readable storage medium storing instructions for generating cryptographic keys which in some cases, can be utilized by the multiparty signing server for signing transactions.

In some cases, server 230 may be configured to generate a key pair required for approvals of transactions conducted by the end-user-key-protection-server 235 (denoted as $D_3$) and requested by person 285. In such cases, the public key of the key pair may be provided to server 245 and server 240. The private key may be distributed among the end-user nodes as aforementioned. For example, in case a user connects the end-user-key-protection-server 235 in order to make a digital currency transaction. In some cases, such a transaction can be purchase, sell, or deposit a digital currency in a server 230. In such cases, the server 230 may be configured as a digital vault for currency receiving, currency depositing or currency withdrawal. In such cases, the end-user-key-protection-server 235 may send the transaction details to server 245 and/or to server 240. Then, server 240 and 245 may conduct an MPC process utilizing the public key provided by server 230 and shares of a private signing key to generate an encrypted signature on the provided transaction details. In some cases, the transaction details may comprise the block height, the hush, the previous block in the chain, the time of the transaction, the type of the transaction (i.e. deposit, withdrawal), and the like. In some other cases, the transaction details may comprise a file name, the name of the person requesting to perform the transaction, the location of the file, and the like.

The end-user-key-protection-server 235 may also receive the encrypted signature from server 245, or in some cases, from server 240 and engage end-user nodes to decrypt the encrypted signature via an MPC. In some cases, the end-user-key-protection-server 235 may engage the end-user nodes via utilizing network communication methods and sending a request to participate in the decryption process. In some cases, the end-user-key-protection-server 235 may check if the end-user nodes are available to communicate over the computer network and participate in the decryption process. In some cases, a threshold decryption process may be utilized, and a subset of end-user nodes may be required to decrypt the encrypted signature. In some cases, wherein the MPC decryption process meet the threshold, the decrypted signature is revealed, and the transaction may be considered as approved.

In some cases, the end-user-key-protection-server 235 may be configured to define relations amongst the end-user nodes, wherein the relations may be required to decrypt the encrypted signature via an MPC. For example, the end-user-key-protection-server 235 may set relations based on Boolean operators amongst the nodes, in order to decrypt the encrypted signature via an MPC. In such an exemplary case, the end-user nodes 219, 221, 222 and 223 in node-group 229 can have an OR relations amongst the end-user nodes. Thru, the MPC decryption process may be between the end-user-key-protection-server 235 and between: end-user node 219, OR, between end-user node 221, OR between end-user node 222, OR between end-user node 223. In some other cases, the Boolean relation may comprise the Boolean operator AND. For example, the MPC decryption process may be between the end-user-key-protection-server 235 and between: end-user node 212 AND end-user node 211. Namely the key shares distributed in end-user node 212 and in the end-user node 211 may utilize with the Boolean operator AND.

Figure 3:
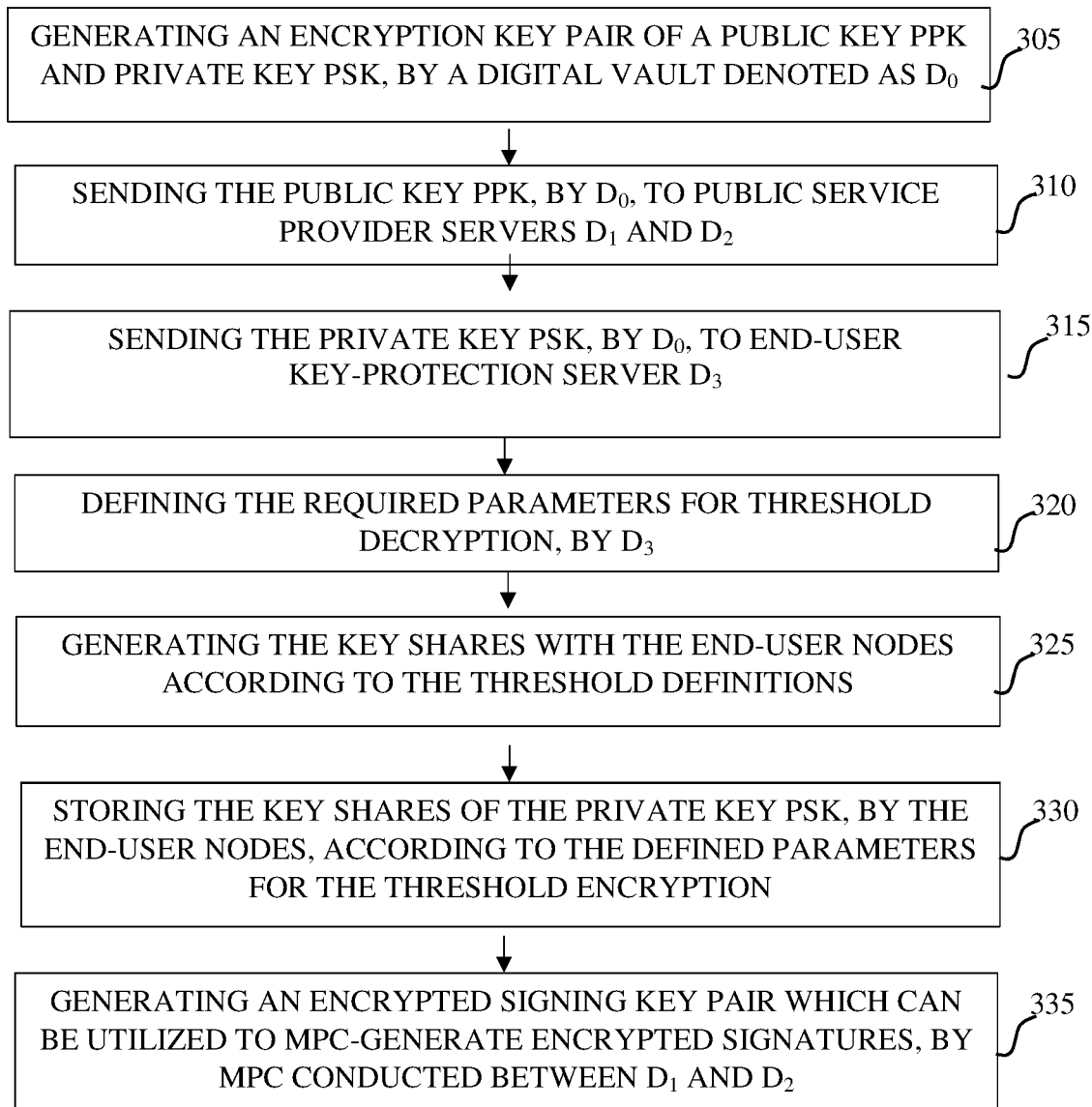
FIG. 3 discloses a method operable by a computerized device for creating a digital vault with an End-user-key-protection-server, according to exemplary embodiments of the present invention.

FIG. 3 discloses a method operable by a computerized device for creating a digital vault with an End-user-key-protection-server, according to exemplary embodiments of the present invention. At step 305 a digital vault denoted as $D_0$ generates an encryption key pair of a public key denoted as PPK and private key denoted as PSK. The digital vault may be a dedicated server computer comprising hardware storage device for storing data, which in some cases may be accessible only by dedicated server computers. The digital vault may be connected to an End-user-key-protection-server which may conduct the authorization processes for the digital vault. For example, the End-user-key-protection-server may operate an authorization mechanism which controls the authorization rules. The End-user-key-protection-server may be configured to access the digital vault upon a successful authorization process.

At step 310 $D_0$ may send the PPK to two servers, $D_1$ and $D_2$, which can be configured to generate an encrypted signature by utilizing and MPC protocol. In such cases, $D_1$ and $D_2$ can also be configured to utilize the PPK for the generation of the encrypted signature. At step 315 $D_0$ may send the private key PSK generated at step 305 to the End-user-key-protection-server denoted as $D_3$. At step 320 $D_3$ can define the required parameters of the predefined threshold decryption, which encodes the authorization rules corresponding for digital signing processes. In such cases, $D_3$ may define the rules required for each predefined threshold decryption process. For example, $D_3$ may be configured to require a certain number of end-user nodes to decrypt the encrypted signature by participating in the MPC process and thereby approve a deposit of 100 bitcoins in the digital vault $D_0$. In such an exemplary case, the certain number of end-user nodes may be the predefined threshold requirements of the threshold decryption, in order to approve the 100 bitcoins deposit.

In some embodiments of the present invention, $D_3$ may be configured to define different roles in the MPC decryption. For example, $D_3$ may define two node-groups of end-user nodes and define the threshold requirements. $D_3$ may define that a certain number of end-user nodes in each node-group may be the minimum required number of end-user nodes for the threshold decryption, such that a 300 bitcoins transaction from a the $D_0$ to a third party is approved. In such an exemplary case, $D_3$ may define the number of end-user nodes from each node-group, required for the threshold decryption, which approve the transaction. $D_3$ may also define other end-user nodes with different authorization roles. For example, $D_3$ may define a certain end-user node which can overrule a transaction approval process, such that a transaction can be approved in case an end-user node having overrule rights, approves the transaction and the other end-user nodes disapprove the transaction. In some configurations of $D_3$, a transaction can be disapproved in case an end-user node having overrule rights, disapproves the transaction and the other end-user nodes approve the transaction. In some cases, an MPC decryption process between the end-user node and the End-user-key-protection-server, which yields a successful decryption of the signed transaction details, may be considered as an approval of the digital transaction.

In some embodiments of the present invention, $D_3$ may be configured with multiple types of authorization roles. The authorization rules of the authorization rules may be encoded in the digital identification process such that a transaction may be approved or disapproved as part of the end-user node digital encryption process. For example, the privilege to approve a deposit of digital currency in a digital vault may be granted to a portion of end-user nodes. In such cases, $D_3$ may require an approval to execute a transaction from at least a predefined number of end-user nodes which are granted with the privileges to approve such a transaction. In some cases, $D_3$ may also be configured to identify customers. In such cases, the customers may be the persons which are granted with the privilege to initiate a transaction of electronic digitized data such as document access, digital transaction approvals, access to multimedia data, and the like.

At step 325 $D_3$ generates key shares of the PSK, with the end-user nodes. In some cases, $D_3$ may utilize an MPC configured to jointly compute with the end-user nodes two or more shares of the PSK. The key shares generated by $D_3$ may be then stored and associated with the end-user node in a dedicated storage associated with $D_3$. In such cases, the end-user nodes receive only a portion of the PSK such that the physical device cannot compromise the PSK, and the PSK decryption may be performed without ever bringing the entire PSK together in one place. The generation of the PSK shares may follow the different roles in the threshold decryption. For example, $D_3$ may generate different key shares with different end-user nodes in different node-groups, in accordance with the different roles of the threshold decryption.

At step 330 the end-user nodes receive and store the key shares of the PSK, according to the defined parameters for the threshold decryption. In such cases, the end-user may be able to utilize the stored key shares in MPC decryption with $D_3$. At step 335 an MPC process may be conducted between $D_1$ and $D_2$, to generate an encrypted signing key which can be utilized to MPC-generate encrypted signatures.

Figure 4:
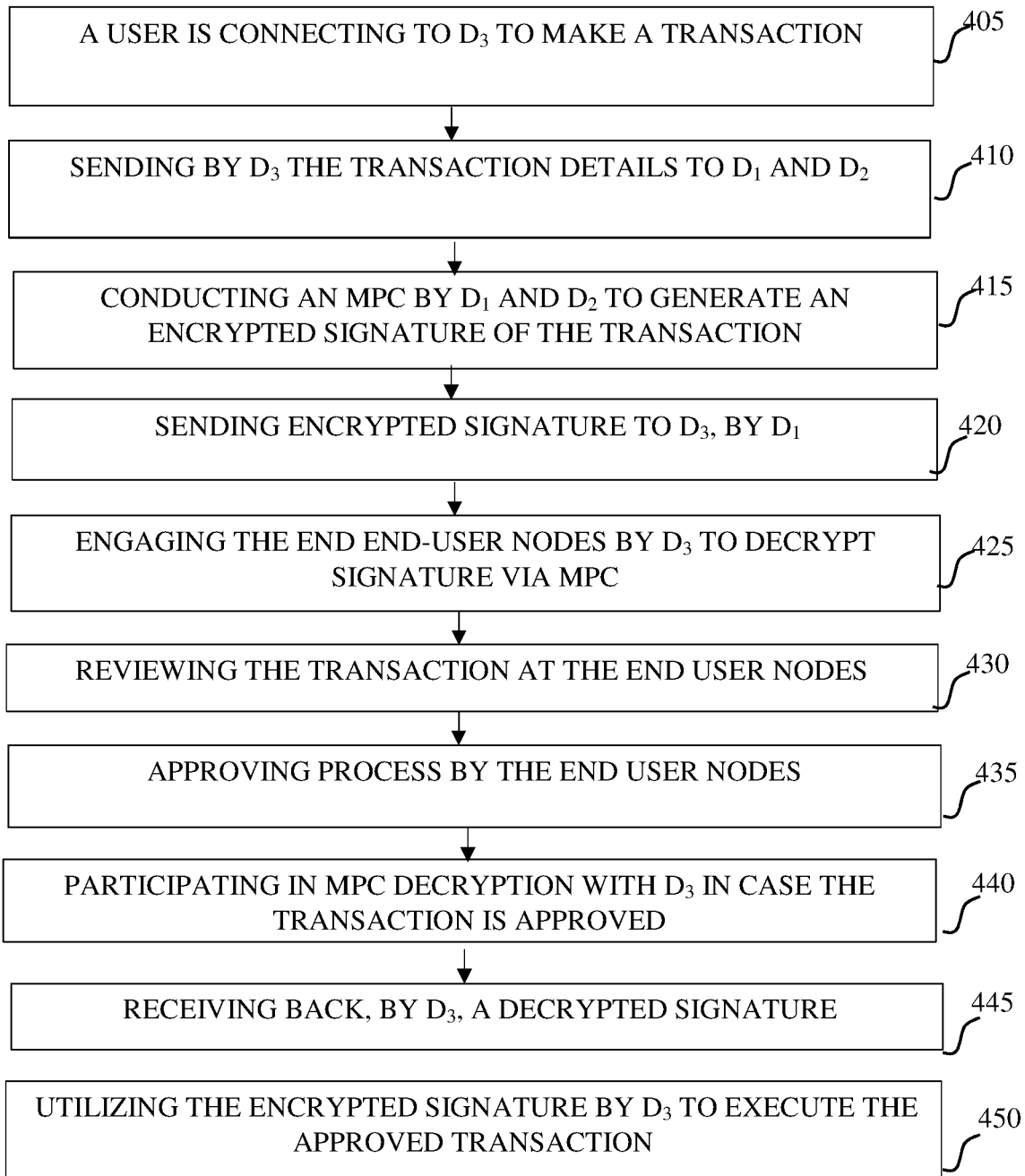
FIG. 4 discloses the process of approving a transaction by MPC process with a threshold decryption process, according to exemplary embodiments of the present invention.

FIG. 4 discloses the process of approving a transaction by MPC process with a threshold decryption process, according to exemplary embodiments of the present invention. At step 405 a user connects to end-user-key-protection-server $D_3$ to make a transaction. In some cases, the user may operate an end-user node defined as an end customer which can initiate certain transaction. The end-user node may comprise a key share which can be utilized to MPC-generate encrypted signatures. In some cases, the key share held by the end-user node may be associated with the end-user node system. In such cases, the key share held by the end-user node and defined as an end customer may be utilized for other users utilizing the end-user node. For example, in case user A utilizes the end-user node for initiate a transaction, and then a user B utilizes the same end-user node, D3 may identify the customers user A and user B, as the same customer.

In some other cases, the key share held by the end-user node may be associated with the person operating the end-user node. In such cases, different user may be associated with different key share. For example, in case user A utilizes the end-user node for initiate a transaction, and then a user B utilizes the same end-user node, $D_3$ may identify the customers user A and user B, as different customers. At step 410 $D_3$ sends the transaction details to $D_1$ and $D_2$. At step 415 $D_1$ and $D_2$ conduct an MPC to jointly generate and encrypted signature of the transaction. At step 420 $D_1$ may send the encrypted signature generated at step 415 to $D_3$. In some embodiments of the present invention, $D_2$ may be the server sending the encrypted signature to $D_3$.

At step 425 $D_3$ engages some end-user nodes to decrypt the encrypted signature. In some case, the engagement of $D_3$ may be executed according to the authorization rules and roles. At step 430 the transaction details may be reviewed at the end-user node. In some cases, a person operating the end-user node may review the transaction details. In some other cases, a computerized process may be operated by the end-user node. For example, a computerized process may be configured review the received transaction details and store the details in a dedicated database associated with said end-user node.

At step 435 the reviewed transaction undergoes an approval process. In some cases, a person operating the end-user node may approve or disapprove the transaction detail. In some other cases, a computerized process may be operated by the end-user node and approve or disapprove the transaction. For example, a computerized process may be configured to approve all transactions characterized to be below a certain transaction limit. At step 440 some of the portion of the end-user nodes which approved the transaction may participate in an MPC decryption process of the encrypted signature. In some cases, the PSK may be utilized for this MPC decryption process as aforementioned.

In some embodiments of the present invention, the key shares held by the end-user nodes may be shares of the same key held by $D_1$ and $D_2$. In such cases, $D_1$ and $D_2$ may be configured to be utilized a shared key for the digital signing, wherein the shared key is the key distributed amongst the end-user nodes and utilized to decrypt the encrypted signature. In some embodiments of the present invention, the key utilized by $D_1$ and $D_2$ may be held and stored by $D_1$ and $D_2$ prior the request to approve the digital transaction. In such cases, the same key may be utilized in multiple digital signing occurrences.

At step 445 $D_3$ may receive the decrypted signatures which may be yielded of the MPC processes occurred between $D_3$ and the end-user nodes. In some cases, wherein the number of the end-user nodes meets the number required for the predefined threshold, in accordance with the authorization rules, the signature is revealed, and the transaction considered as approved. At step 450 the encrypted signature may be utilized by $D_3$ to approve and execute the transaction. For example, $D_3$ may send a transaction to a digital vault for deposit or transfer a certain amount of digital currency, in case the number of end-user nodes participating in the MPC description process, meets the required threshold.

Figure 5:
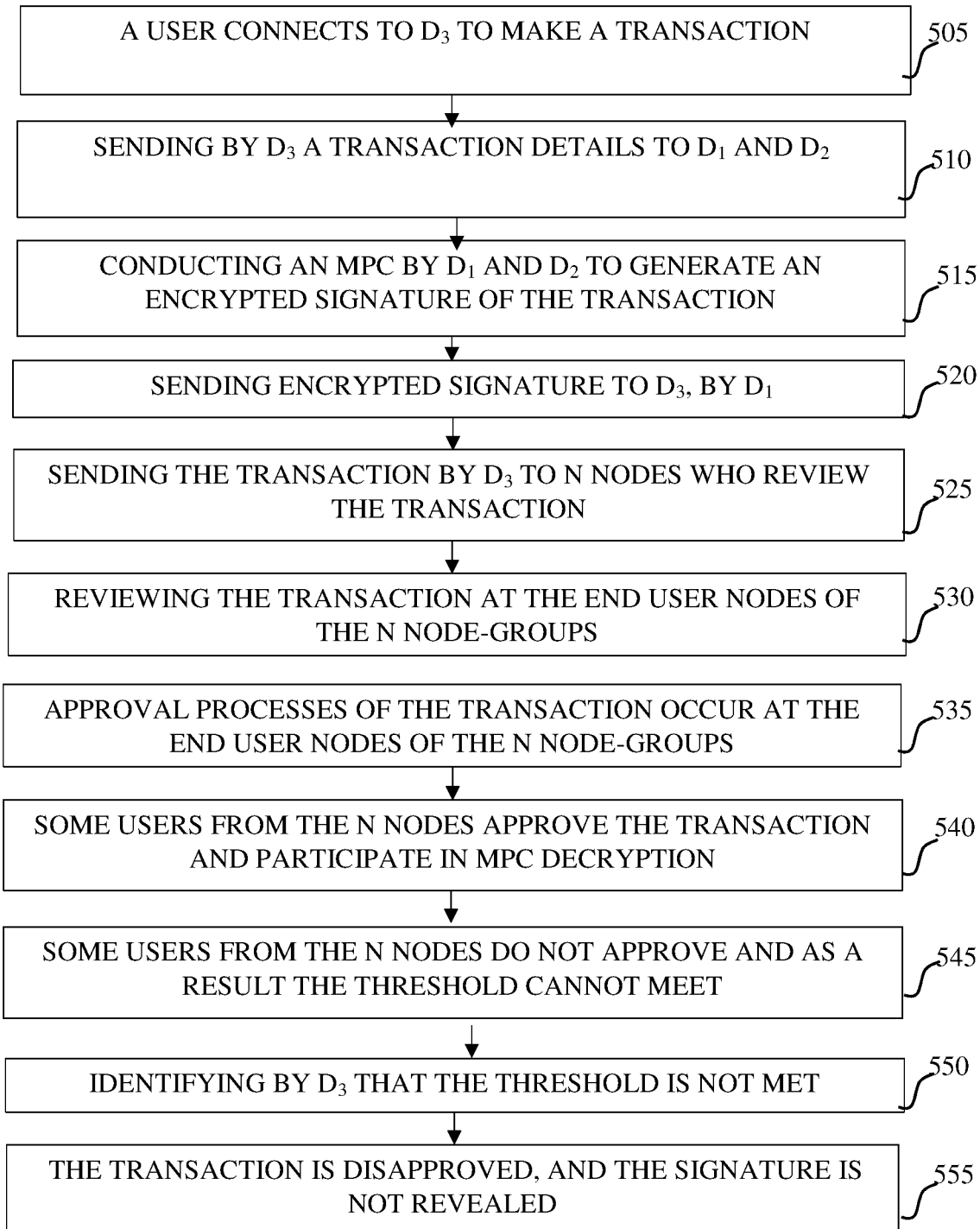
FIG. 5 discloses the process of disapproving a transaction by access structure based on MPC approval process with a threshold decryption and authorization rules, according to exemplary embodiments of the present invention.

FIG. 5 discloses the process of disapproving a transaction by access structure based on MPC approval process with a threshold decryption and authorization rules, according to exemplary embodiments of the present invention. At step 505 a user connects to end-user-key-protection-server $D_3$ to make a transaction. In some cases, the user may operate an end-user node defined as an end customer which can initiate certain transaction. At step 515 $D_1$ and $D_2$ conduct an MPC to generate and encrypted signature of the transaction details. At step 520 $D_1$ may send the encrypted signature generated at step 515 to $D_3$. In some cases, the access structure may be configured such that, $D_2$ may send the encrypted signature to $D_3$.

At step 525 $D_3$ engage a portion of N end-user nodes to decrypt the encrypted signature and then send the encrypted signature to the N engaged nodes. In some case, the engagement of $D_3$ may be executed according to the authorization rules. For example, the encrypted signature may be sent just to the end-user nodes required for the threshold decryption processes, according to the authorization rules. In some cases, the portion of the N engaged end-user nodes may be associated to one node-group. In some other cases, the portion of the N engaged end-user nodes may associated to more than one node-groups. At step 530 the transaction details may be reviewed by the portion of the N engaged end-user of the node-groups. In some cases, a person operating the end-user node may review the transaction details. In some other cases, a computerized process may be operated by the end-user nodes. At step 535 some of the reviewed transaction undergoes an approval process by the end-user nodes. In some cases, some persons operating the end-user nodes may review the transaction detail. In some other cases, a computerized process may be operated by the end-user node and review the transaction.

At step 540 some of the end-user nodes from the portion of the N end-user nodes approve the transaction and participate in an MPC decryption process of the encrypted signature. In some cases, the PSK may be utilized for this MPC decryption process as aforementioned. At step 545 some end-user nodes from the N end-user nodes disapprove the transaction and do not participate in any MPC decryption process of the encrypted signature. At step 550 $D_3$ may identify that the number of end-user nodes participating in the MPC decryption process, meets the predefined threshold and the encrypted signature cannot be revealed. At step 555 the transaction cannot be approved.

Figure 6:
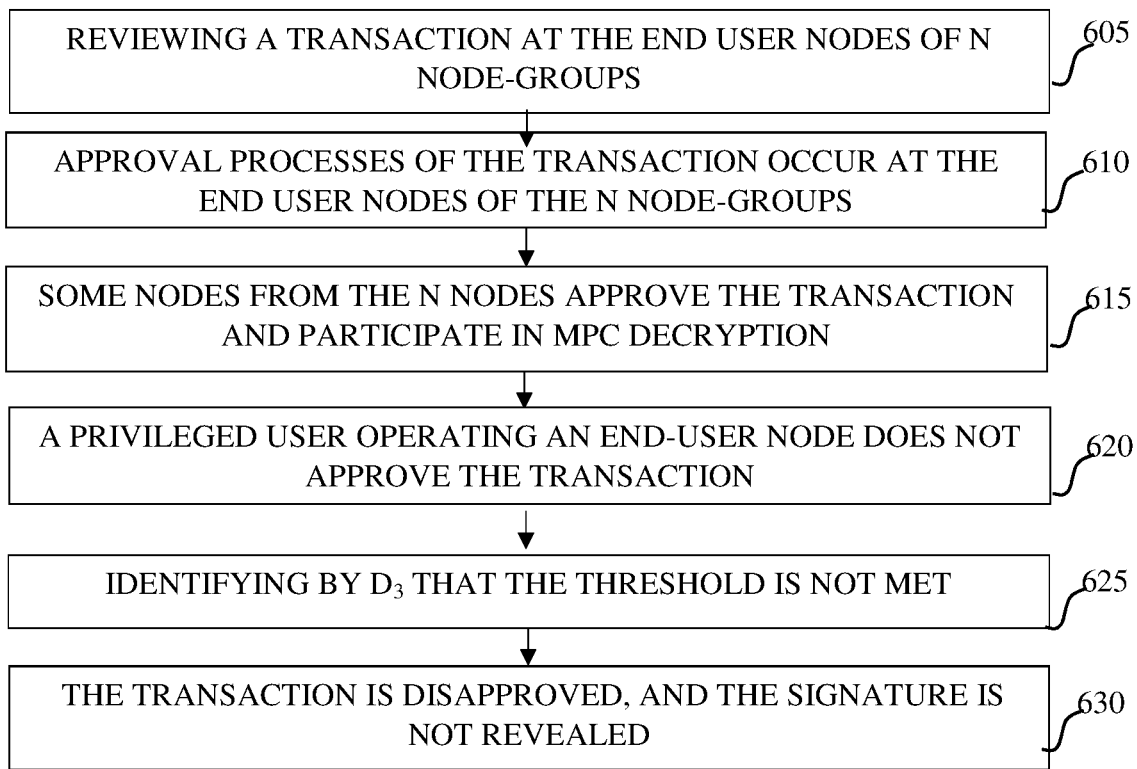
FIG. 6 shows a part of a process of disapproving a transaction by access structure based on MPC approval process with a threshold decryption and authorization rules, wherein a privileged user overrules a transaction approval, according to exemplary embodiments of the present invention.

FIG. 6 shows a part of a process of disapproving a transaction by access structure based on MPC approval process with a threshold decryption and authorization rules, wherein a privileged user overrules a transaction approval, according to exemplary embodiments of the present invention. At step 605 a transaction details may be reviewed by a portion of N end-user nodes of the nodes. In some cases, a person operating the end-user node may review the transaction details. In some other cases, a computerized process may be operated by the end-user node. In such cases, the reviewing may occur as part of an MPC approval process, as aforementioned. At step 610 the reviewed transaction undergoes an approval process by the end-user nodes as aforementioned.

At step 615 some end-user nodes from some node-groups approve the transaction and participate in an MPC decryption process of the encrypted signature. In some cases, the PSK may be utilized for this MPC decryption process as aforementioned. In some cases, the number of nodes may meet the threshold required for the threshold decryption process. At step 620 a privileged user operating an end-user node do not approve the transaction. In such a case, the privileged user may not participate in any MPC decryption process of the encrypted signature and thereby the transaction may not be approved. In some embodiments of the present invention, the privileges to approve or disapprove a transaction and thereby to overrule the approval process of other N nodes may be associated with a specific end-user node. Thus, different users may operate said specific end-user node and approve or disapprove transactions. In some possible embodiments of the present invention, the privileges to overrule the approval process of other N nodes may be associated with a specific person. Thus, said specific person may operate different end-user nodes and approve or disapprove transactions. In some cases, the privileges to overrule an approval process may be associated with the person's credentials.

At step 625 $D_3$ may identify that the predefined threshold is not met. At step 630 the transaction is disapproved, and the encrypted signature cannot be revealed.

In some embodiments of the present invention, the privileged user may be granted with the privileges to only approve a transaction. For example, in case a person operating an end-user node denoted as $C_1$, is granted with an overrule privilege, a defined rule may be $C_1$ AND Other end-user nodes. In such an exemplary case, if $C_1$ disapproves the transaction, the key share held by $C_1$ cannot be utilized, and thereby the transaction is disapproved. In such an exemplary case, if the required number of nodes for approving a transaction is met, the privileged user may not have the privileges to disapprove the transaction. In some cases, a privileged user may be granted with the privileges to disapprove and approve transactions.

In some embodiments of the present invention $D_3$ may define different node-groups with different thresholds for approving a transaction. For example, $D_3$ may define a node-group denoted as group A which required at least 4 end-user nodes for revealing the encrypted signature, and thereby approving a digital transaction. $D_3$ may also define a node-group denoted as group B which required at least 3 end-user nodes for revealing the encrypted signature, and thereby approving a digital transaction. In some cases, D3 may define that an encrypted signature can be revealed by a certain number of end-user nodes from one node-group and with another certain number of end-user nodes from another node-group. For example, D3 may define that for a certain type of transaction, a threshold decryption may require 3 end-user nodes from node-group A and 5 end-user nodes from group B.

In some cases, the privileges to overrule an approval of a transaction may be associated with an end-user node and a specific node-group. For example, a user may be granted with the privileges to overrule an approval of a transaction approved by one node-group only, i.e., group A. Said user may not be granted with the privilege to overrule an approval of a transaction approved by another node-group, i.e., group B.

Figure 7:
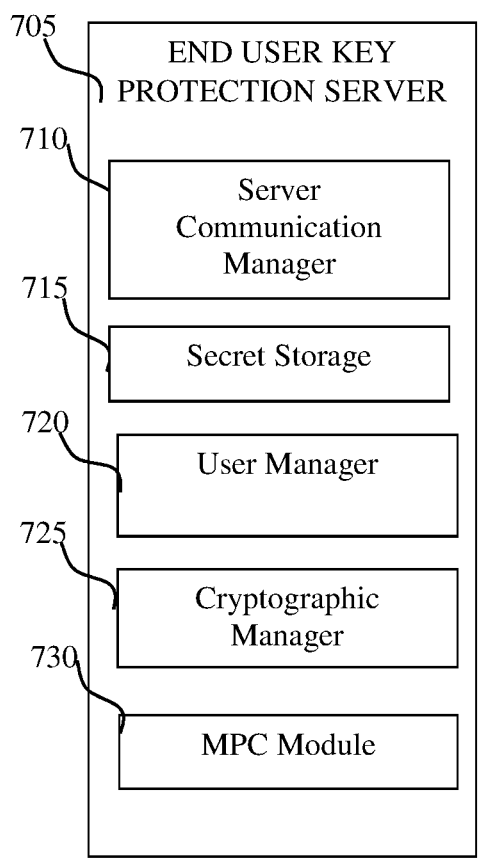
FIG. 7 shows an end-user-key-protection-server designed to control and secure security processes between an end-user node operated by a user and a transaction server, or a digital vault by a digital signature technology, according to exemplary embodiments of the present invention.

FIG. 7 shows an end-user-key-protection-server designed to control and secure security processes between an end-user node operated by a user and a transaction server, or a digital vault by a digital signature technology, according to exemplary embodiments of the present invention. FIG. 7 shows an end-user-key-protection-server 705 comprises a Server Communication Manager 710 which manages communications over communication networks with an entity comprises electronic digitized data, such as transaction server, or a digital vault comprising electronic digitized data. The end-user-key-protection-server comprises a processor coupled (not shown) to a computer-readable medium (not shown), wherein the processor is programmed to operate the storage, the software modules, the software managers, and the like, of the end-user-key-protection-server.

The end-user-key-protection-server 705 comprises a Secret Storage 715 which can be a software element manages the computer-readable medium, the Secret Storage 715 may be utilized for storing cryptographic secretes utilized for the approval processes of the transactions. For example, the Secret Storage 715 may comprise the PSK received from a digital vault. The PSK may be stored in the computer-readable medium and managed by the Secret Storage 715.

The end-user-key-protection-server 705 also comprises a User Manager 720 which in some cases can be configured to associate users or end-user nodes with authorization rules. For example, a user identity, or an end-user node identity can be stored in the User Manager 720 associated with the privilege rights to overrule some transactions, as aforementioned. In some cases, the User Manager 720 may also comprise a list of transactions or transaction details associated with the privileged users or the privileged end-user nodes, for the purpose of managing authorization processes with the digital vault.

The end-user-key-protection-server 705 also comprises a Cryptographic Manager 725 designed to perform tasks and processes related to cryptography such as generating keys, receive and store an encrypted signature, decrypt and encrypt data, compare data with decrypted data, and the like. The end-user-key-protection-server 705 also comprises an MPC Module 725 designed to manage the multi-party computing process with the end-user nodes, as aforementioned. In some embodiments of the present invention the end-user-key-protection-server 705 may be implemented on a personal computer or in some cases on a computerized device capable of operating the MPC Module 725. Such a computerized device may also comprise the Server Communication Manager 710, Secret Storage 715, User Manager 720, and the Cryptographic Manager 725. The end-user-key-protection-server 705 may be operable on a computerize device comprising computer-readable storage medium storing instructions that when executed by a computer cause the computer to perform a method for using a computer system. The end-user-key-protection-server 705 can be configured to connect with end-user nodes operated by persons and preform MPC processes as aforementioned, over communication networks. Such communication networks may be radio frequency (RF) based communication also known in the industry as Wi-Fi, wired based communications to the internet, and the like.

Figure 8:
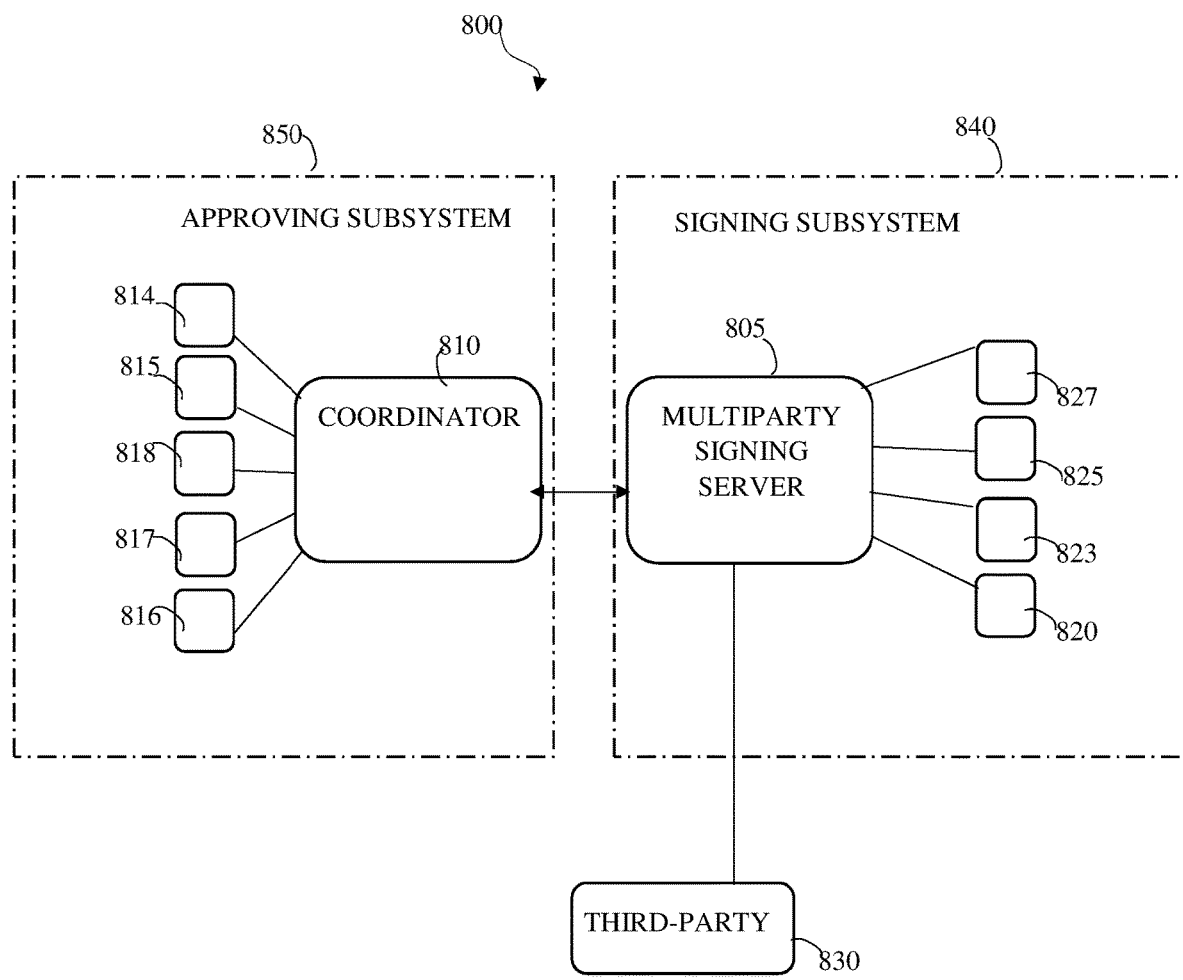
FIG. 8 shows a multiparty signing system comprising an approving subsystem and signing subsystem, according to FIG. 2.

FIG. 8 shows a multiparty signing system comprising an approving subsystem and a signing subsystem, according to FIG. 2. FIG. 8 shows multiparty signing system 800 comprising a first subsystem denoted as signing subsystem 840 and a second subsystem denoted as an approving subsystem 850. The approving subsystem 850 can be authorized to generate a key share group which can participate in the transaction multiparty signing process. The signing subsystem 850 comprises a first subset of the end-user nodes such as end-user nodes 827, 823, 825, and 820. The approving subsystem 850 comprises a second subset of end-user nodes such as end-user nodes 814, 815, 816, 817, and 818.

In some embodiments of the present invention, the approving subsystem 850 may be characterized without a direct control or connection by/to any entity, e.g., second subset of end-user nodes, communicating via a telecommunicating network. In such cases, the computers, servers, and second subset of the end-user nodes forming the approving subsystem 850 may be connected off-line and thereby conduct the cryptographic tasks independently without any communication with other entities on external networks. Such external networks may be any network which is not utilized for communication taking place between the entities of the approving subsystem 850.

As for the signing subsystem 840, in some cases, the computers, servers, and first subset of end-user nodes forming the signing subsystem 840 may be connected online, and thereby conduct a direct connection among the first subset of end-user nodes during the cryptographic processes. In possible embodiments of the present invention, the signing subsystem 840 may be characterized without a direct control or connection by/to any entity communicating via a telecommunicating network. In such cases, the computers, servers, and the first subset of the end-user nodes forming the signing subsystem 840 may be connected off-line and thereby conduct the cryptographic tasks independently without any communication with other entities on external networks. Such external networks may be any network which is not utilized for communication taking place between the entities of the signing subsystem 840.

The term "connected online" utilized herein depicts parties configured to guarantee to be connected to each other at the same time during the cryptographic process, whereas the term "connected off-line" utilized herein depicts parties configured to guarantee to be connected to receive a single message and/or send a single message but are not synchronized nor connected to each other at the same time, during the cryptographic process.

The signing subsystem 840 comprising a multiparty signing server 805 which can function an end-user-key-protection-server. The multiparty signing server 805 can protect the key shares distributed amongst the first subset of the end-user nodes 827, 823, 825, and 820. The first subset of the end-user nodes of the signing subsystem 840 can be configured such that, a portion of key shares distributed amongst the nodes of nodes 827, 823, 825, and 820 can be used for multi-signing processes conducted by the multiparty signing server 805. In possible embodiments of the present invention, the signing subsystem 840 and the first subset of the end-user nodes 827, 823, 825, and 820 may be structured in an access structure format encoding some authorization rules corresponding for MPC encryption processes and/or for the digital signing processes. For example, the nodes 827, 823, 825, and 820 may be configured such that only an authorized subset of nodes 827, 823, 825, and 820 can participate in the MPC process conducted by the multiparty signing server 805. In some embodiments of the present invention, the access structure embodies in the signing subsystem 840 may be configured to conduct a threshold decryption process for providing further security and reliability.

In some cases, the multiparty signing server 805 may be configured to generate a signature by conducting an MPC with several nodes of the first subset of the end-user nodes 827, 823, 825, and 820. For example, the multiparty signing server 805 can utilized to conduct an MPC processes with some nodes of the first subset of the end-user nodes 827, 823, 825, and 820 to generate a signature for a digital transaction with a third-party server. In such cases, the multiparty signing server 805 may be configured to communicate with a third-party server 830 for sending signed transactions. For example, in case the third-party server 830 is a digital vault, the multiparty signing server 805 can be configured to sign on transaction for the third-party server 830 such as currency receiving, currency depositing or currency withdrawal.

In some embodiments of the present invention, the approving subsystem 850 may comprise a coordinator 810 configured to communicate with the multiparty signing server 805. The coordinator 810 may be computerized software application implemented in a computerized device comprising a processing unit instructed to execute the computerized method of the coordinator 810 software application. The computerized device operating the coordinator 810 may also comprise a memory unit required for the operational tasks of the coordinator 810 software application.

In some cases, the coordinator 810 may also be configured to communicate with an authorized the second subset of the end-user nodes 814, 815, 816, 817, and 818. In some cases, the second subset of end-user nodes may hold key shares which can be utilized by the coordinator 810 to conduct a number of cryptographic functions. The configuration of the second subset of the end-user nodes 814, 815, 816, 817, and 818 can allow sending data shares of a signature to the coordinator 810. In some cases, the coordinator 810 can be configured to assemble said data shares to be a part of a digital signature of a transaction. In some other cases, the second subset of the end-user nodes 814, 815, 816, 817, and 818 can be configured to utilize key shares for a decryption process via an MPC conducted by the coordinator 810.

In some embodiments of the present invention, the second subset of the end-user nodes 814, 815, 816, 817, and 818 may be structured in an access structure format encoding some authorization rules corresponding for MPC decryption processes of the digital signing processes. In some cases, the second subset of the end-user nodes 814, 815, 816, 817, and 818 can hold data shares of a digital signature. In such cases, the data shares may be characterized by the fact that they can be assembled to form one part of a digital signature. In some cases, the one part of the digital signature can be jointly utilized with other part of the digital signature and thereby to form the completed digital signature. In some cases, the other part of the digital signature may be provided by the signing subsystem 840. Thus, such a configuration of the multiparty signing system 800 cryptographically enforces the approval of the approving subsystem 840 such that if some end-user nodes, or servers connected to the approving subsystem 840 are corrupted and/or cheating, a valid signature cannot be generated.

The coordinator 810 may also be configured to communicate with the multiparty signing server 805 as a part of the digital signing process, or the decryption/encryption processes conducted by the multiparty signing server 805. For example, the coordinator 810 can be configured to send one part of the digital signature formed by the data shares held by the second subset of the end-user nodes 814, 815, 816, 817, and 818 to the multi-party signing server 805. In some other exemplary cases, the coordinator 810 may be configured to utilize the authorization rules encoded in the access structure of the second subset of the end-user nodes 814, 815, 816, 817, and 818 for approving digital transactions to the third-party server 830.

Figure 9:
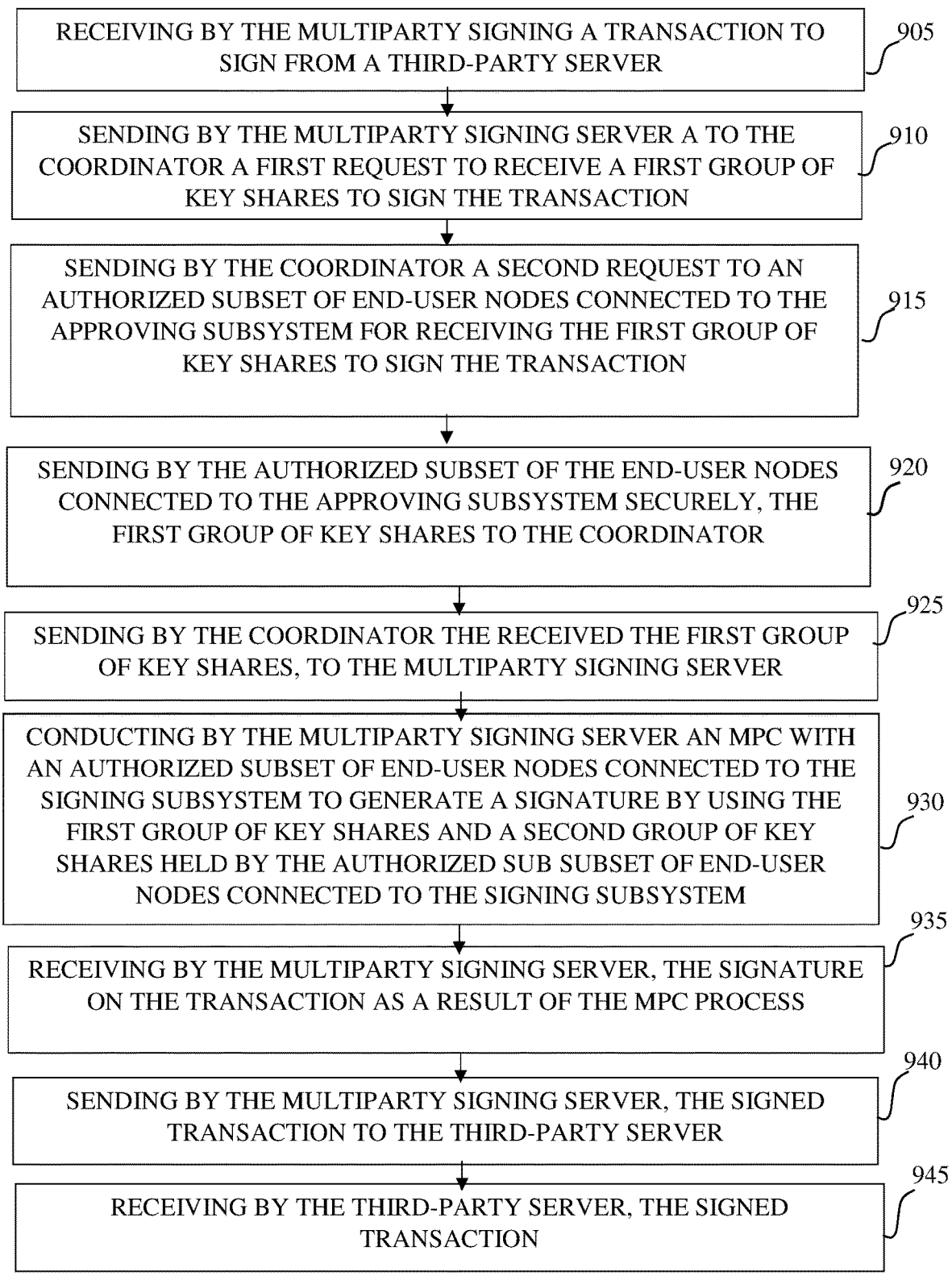
FIG. 9 shows multiparty signing system comprising a subset of end-user nodes authorized generate a key share group which can participate in the transaction multiparty signing process, according FIG. 8.

FIG. 9 shows multiparty signing system comprising a subset of end-user nodes authorized generate a key share group which can participate in the transaction multiparty signing process, according to exemplary embodiments of the present invention. At step 905 a multiparty signing server receives a transaction to sign from a third-party server. Such a transaction can be such as an approval to transfer currency, signing on a document, and the like. At step 910, the multiparty signing server sends to the coordinator a first request to receive a first group of key shares for signing the transaction. Such a group of key shares may be jointly utilized by the multiparty signing server for signing the transaction. In some cases, the coordinator may communicate with a subset of end-user nodes, connected to an approving subsystem, to receive the key shares of the group. In some cases, the end-user nodes connected to the approving subsystem may be connected off-line to each other. In some cases, the coordinator may be functioning such as an end-user-key-protection-server wherein the end-user nodes end-user nodes connected to the approving subsystem designed to control shares of cryptographic keys utilized for digital signing, as aforementioned.

At step 915 the coordinator sends a second request to the authorized subset of end-user nodes connected to the approving subsystem, to receive the first group of key shares for signing the transaction, as aforementioned. At step 920 the subset of end-user nodes which received the second request from the coordinator securely send the first group of key shares to the coordinator. In some cases, the coordinator may conduct an MPC with the end-user nodes for receiving the key shares, wherein in some cases, the end-user nodes may be connected off-line to each other. In some other cases, said end-user nodes may encrypt the share with a cryptographic key and send the encrypted key share to the coordinator. In some cases, the encrypted signature may be decrypted in case the number of end-user nodes meets a predefined threshold. Such end-user nodes may be end-user nodes designed to participate in such an MPC processes as aforementioned.

At step 925 the coordinator sends the received key shares as the first group of key shares to the multiparty signing server. At step 930 the multiparty signing server conducts an MPC with an authorized subset of end-user nodes connected to the approving subsystem, to generate a signature. Thus, the multiparty signing server conducts an MPC with an authorized subset of end-user nodes connected to the signing subsystem to generate a signature, by using the first group of key shares and a second group of key shares held by the authorized sub subset of end-user nodes connected to the signing subsystem. Such an MPC process may utilize the first group of key shares received from the coordinator and a second group of key shares held by the authorized subset of end-user nodes.

In some cases, the multiparty signing server may encode authorization rules corresponding for MPC signing processes of the digital transaction, as aforementioned. In some cases, the authorization rules may be designed to require at least one combination of end-user nodes connected to the signing subsystem and require participating in the MPC processes for signing the digital transaction. In some cases, the authorization rules may be designed to require a utilization of Boolean operators amongst the key shares utilized in the MPC processes to sign the digital transaction, as aforementioned.

At step 935 the multiparty signing server receives the signature of the transaction as result of the MPC conducted with the authorized subset of the end-user nodes connected to the signing subsystem. At step 940 the multiparty signing server sends the signed transaction to the third-party server.

At step 945 the third-party server can use the signed transaction to carry out the operation to which the signed transaction was required.

Figure 10:
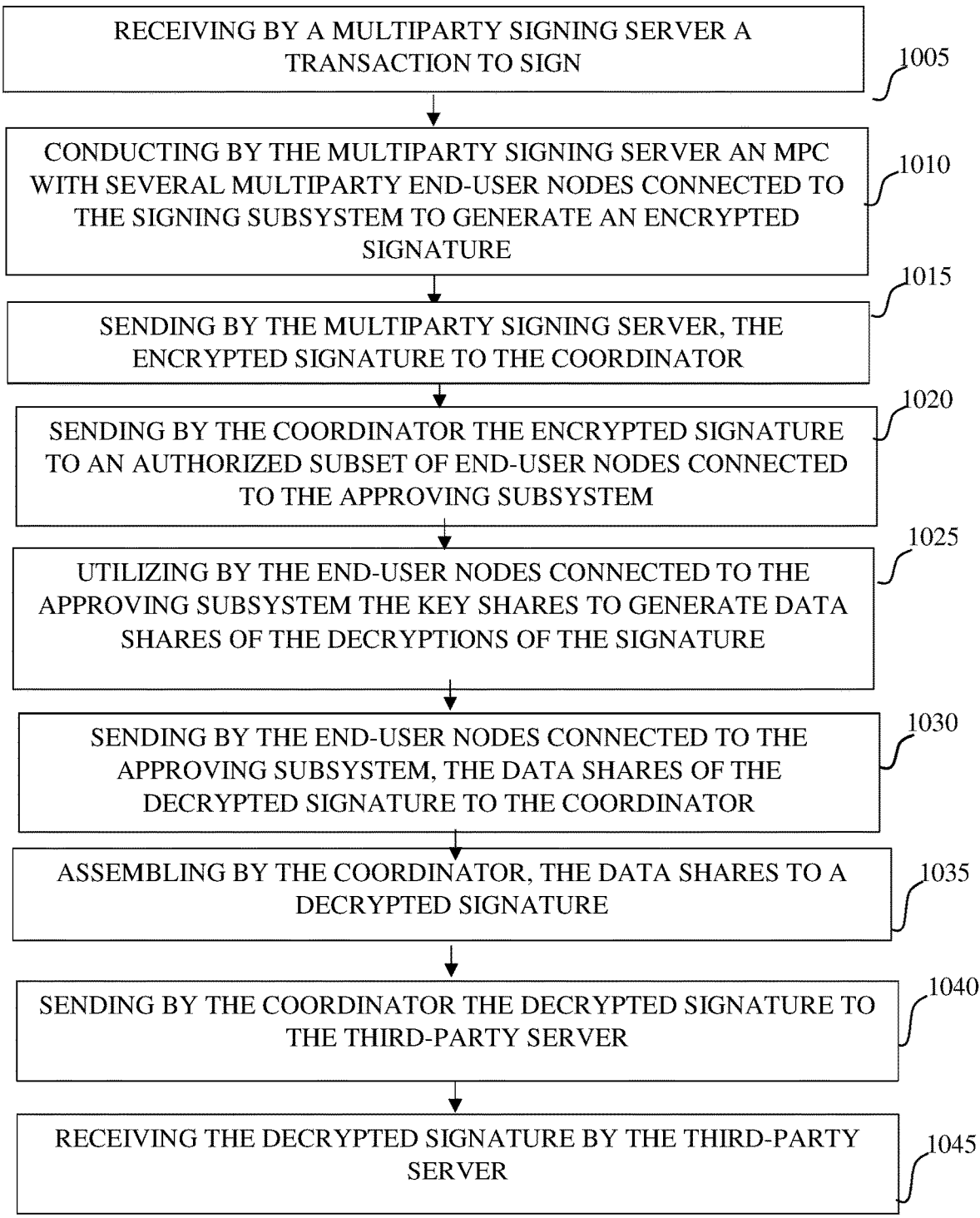
FIG. 10 discloses a method operable by a multiparty signing system for decrypting a signed transaction and transmitting the decrypted signature to a third-party server, according to FIG. 8.

FIG. 10 discloses a method operable by a multiparty signing system for decrypting a signed transaction and transmitting the decrypted signature to a third-party server, according to exemplary embodiments of the present invention. At step 1005 a multiparty signing server receives a transaction to sign from a third-party server. In some cases, such a multiparty signing server can be a member in a signing subsystem as aforementioned. In some other cases, the multiparty signing server may be an end-user-key-protection-server designed to receive a request for performing a digital transaction provided by a person operating the third-party server. Such a third-party server can be a computerized device comprising computer-readable storage medium storing instructions for generating cryptographic keys which in some cases, can be utilized by the multiparty signing server for signing transactions.

At step 1010 the multiparty signing server conducts MPC with several end-user nodes connected to the signing subsystem to generate an encrypted signature as aforementioned. At step 1015 the multiparty signing server sends the encrypted signature to a coordinator. Such a coordinator can be a member of an approving subsystem as aforementioned. At step 1020 the coordinator sends the encrypted signature to an authorized subset of end-user nodes connected to the approving subsystem. In some cases, the authorized subset of the end-user nodes may use MPC to generate a portion of one decrypted signature. In some cases, the end-user nodes connected to the approving subsystem may hold key shares distributed in a structure which encodes authorization rules corresponding for the assembling processes of the signature.

In some cases, the portion of the engaged end-user nodes connected to the approving subsystem may be associated to one node-group. In some other cases, the portion of the engaged end-user nodes connected to the approving subsystem may associated to more than one node-groups. At step 1025 the end-user nodes connected to the approving subsystem utilize the key shares to generate data shares of the decrypted signature. At step 1030 the end-user nodes connected to the approving subsystem send the data shares of the decrypted signature to the coordinator. In some cases, sending the data shares can be according to the authorization rules. At step 1035 the coordinator assembles the data shares to one decrypted signature. At step 1040 the coordinator sends the decrypted signature to the third-party server. At step 1045 the third-party server receives the decrypted signature. The third-party can then carry out the transaction.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A system for securing digital transactions, comprising:
a multiparty signing server communicating with a coordinator, wherein the multiparty signing server is connected to a first subset of end-user nodes and the coordinator is connected to a second subset of end-user nodes, and wherein the multiparty signing server comprises a processor coupled to a memory, wherein the multiparty signing server processor is configured to:
   receive from a third-party server a transaction to sign;
   send a first request to the coordinator to receive a first group of key shares;
   receive the first group of key shares from the coordinator;
   utilize the received first group of key shares and a second group of key shares to conduct a multiparty communication (MPC) process with the first subset of end-user nodes, wherein the MPC process produces a signature used to sign the transaction;
   receive the signed transaction as a result of the MPC process; and
   send the signed transaction to the third-party server;
wherein the coordinator comprises a coordinator processor coupled to a memory, the coordinator processor is configured to:
   send to the second subset of the end-user nodes a second request to receive the first group of key shares;
   receive from the second subset of the end-user nodes the first group of key shares; and
   send the received first group of key shares to the multiparty signing server,
wherein the second subset of the end-user nodes is configured to be connected to the coordinator and thereby forming an approving subsystem, and
wherein the second subset of the end-user nodes which are connected to the approving subsystem are connected off-line such that the end-user nodes are configured to guarantee to be connected to receive a single message or send a single message but are not synchronized nor connected to each other at the same time, during the MPC process.

2. The system of claim 1, wherein the first subset of end-user nodes is configured to be connected to the multiparty signing server and thereby forming a signing subsystem.

3. The system of claim 2, wherein the signing subsystem is configured with threshold rules encoded in the first subset of the end-user nodes according to an access structure format.

4. The system of claim 2, wherein the first subset of the end-user nodes is configured to be connected off-line to the signing subsystem such that the end-user nodes are configured to guarantee to be connected to receive a single message or send a single message but are not synchronized nor connected to each other at the same time, during the MPC process.

5. The system of claim 2, wherein the first subset of the end-user nodes is configured to be connected online to the signing subsystem such that the end-user nodes are configured to guarantee to be connected to each other at the same time during the MPC process.

6. The system of claim 1, wherein the approving subsystem is configured with threshold rules encoded in the second subset of the end-user nodes according to an access structure format.

7. The system of claim 1, wherein the second subset of end-user nodes which are connected to the approving subsystem are connected online such that the end-user nodes are configured to guarantee to be connected to each other at the same time during the MPC process.

8. The system of claim 1, wherein the multiparty signing server processor is further configured to send the signed transaction is sent to the third-party server to carry out an operation for which the signed transaction was required.

9. A method for securing a digital transaction operable by a multiparty signing server communicating with a coordinator, wherein the multiparty signing server is connected to a first subset of end-user nodes and the coordinator is connected to a second subset of end-user nodes thereby forming an approving subsystem, comprising:

receiving a transaction to sign by the multiparty signing server, wherein the transaction to sign is received from a third-party server;

sending by the multiparty signing server a first request to receive a first group of key shares, wherein said first request is sent to a coordinator;

sending by the coordinator a second request to receive the first group of key shares, wherein the second request is sent to the second subset of the end-user nodes;

receiving the first group of key shares by the coordinator, wherein the first group of key shares is sent by the second subset of the end-user nodes;

sending the received first group of key shares by the coordinator, to the multiparty signing server;

conducting a multiparty computation (MPC) process by the multiparty signing server to generate a signature, wherein the MPC process is conducted between the multiparty signing server and the to the first subset of the end-user nodes, by using the received first group of key shares and a second group of key shares held by the first subset of the end-user nodes;

receiving by the multiparty signing server the signature on the transaction as a result of the MPC process; and sending the signed transaction to the third-party server, wherein the second subset of the end-user nodes which are connected to the approving subsystem are connected off-line such that the end-user nodes are configured to guarantee to be connected to receive a single message or send a single message but are not synchronized nor connected to each other at the same time, during the MPC process.

10. The method of claim 9, wherein the digital transaction includes an access to a digital document on a computer network.

11. The method of claim 9, wherein the digital transaction includes signing on a digital document on a computer network.

12. The method of claim 9, wherein the MPC process performed to generate the digital transaction is conducted by at least two servers.

13. The method of claim 9, wherein the signature is generated only when the number of end-user nodes of the second subset of the end-user nodes meets a predefined threshold.

14. The method of claim 9, wherein the coordinator encodes authorization rules corresponding for the MPC process.

15. The method of claim 14, wherein the authorization rules require at least one combination of the second subset of the end-user nodes to participate in the MPC process to approve a digital transaction.

16. The method of claim 14, wherein the authorization rules require at least one combination of end-user nodes of the second subset to participate in the MPC process to approve the digital transaction.

17. The method of claim 14, wherein the authorization rules require a utilization of Boolean operators amongst the key shares utilized in the MPC process to sign the digital transaction.

* * * * *